Sept. 6, 1966  G. F. NADEAU ETAL  3,271,178
ADHERING LAYER TO POLYESTER FILM
Filed Oct. 14, 1965

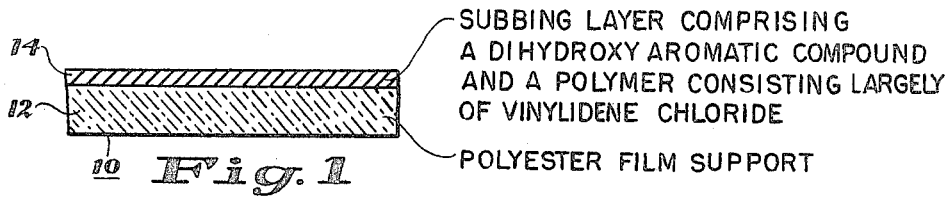

Fig. 1 — Subbing layer comprising a dihydroxy aromatic compound and a polymer consisting largely of vinylidene chloride (14); Polyester film support (12).

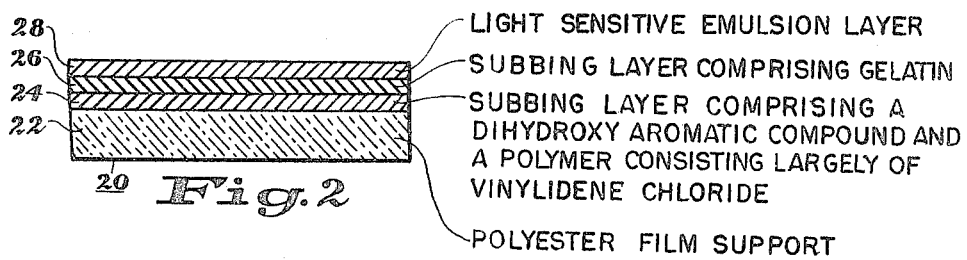

Fig. 2 — Light sensitive emulsion layer (28); Subbing layer comprising gelatin (26); Subbing layer comprising a dihydroxy aromatic compound and a polymer consisting largely of vinylidene chloride (24); Polyester film support (22).

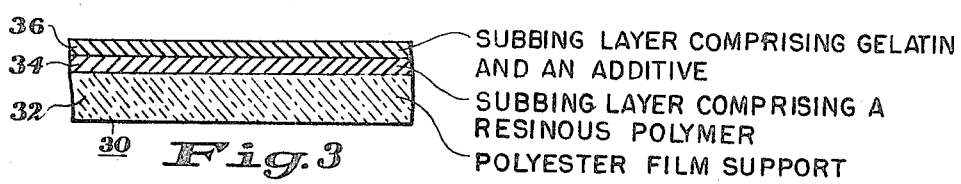

Fig. 3 — Subbing layer comprising gelatin and an additive (36); Subbing layer comprising a resinous polymer (34); Polyester film support (32).

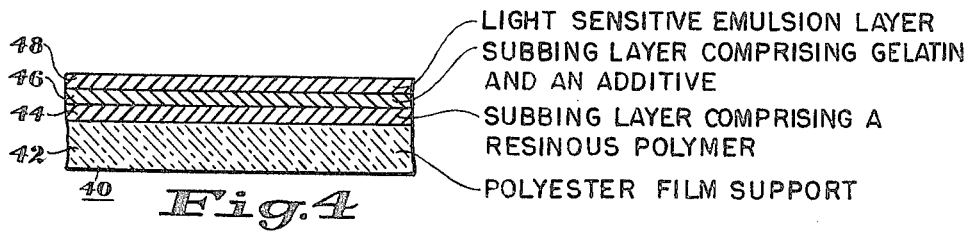

Fig. 4 — Light sensitive emulsion layer (48); Subbing layer comprising gelatin and an additive (46); Subbing layer comprising a resinous polymer (44); Polyester film support (42).

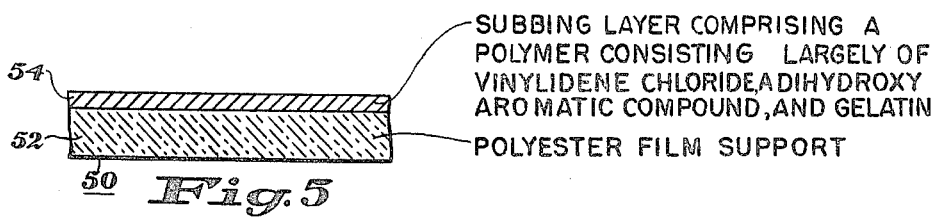

Fig. 5 — Subbing layer comprising a polymer consisting largely of vinylidene chloride, a dihydroxy aromatic compound, and gelatin (54); Polyester film support (52).

Gale F. Nadeau
Clemens B. Starck
INVENTORS
BY R. Frank Smith
Charles L. Board
ATTORNEYS 3,271,178
ADHERING LAYER TO POLYESTER FILM
Gale F. Nadeau and Clemens B. Starck, Rochester, N.Y., assignors to Eastman Kodak Company, Rochester, N.Y., a corporation of New Jersey
Filed Oct. 14, 1965, Ser. No. 497,602
10 Claims. (Cl. 117—7)

This application is a continuation-in-part of application Serial No. 94,803, filed March 10, 1961, now abandoned, in the names of Gale F. Nadeau and Clemens B. Starck which, in turn, is a division of copending application Serial No. 15,542, now Patent No. 3,143,421, filed March 17, 1960, in the names of Gale F. Nadeau, Clemens B. Starck and Frederick J. Jacoby.

This invention concerns the adhering of various layers to polyester sheet or film surfaces. More particularly this invention relates to improving the application of subs and other coatings onto polyethylene terephthalate film base whereby a film base is obtained which carries polymeric subs, gelatin layers and the like thereby providing a product suitable for photographic purposes.

Polyester sheets, films and the like are well-known commercial materials which possess a number of advantages for many uses. However, the use of such polyester material in the photographic art and for certain other purposes has been handicapped to some extent because of the difficulty of suitably adhering various other layers to the polyester surface. As is known, photographic film products are comprised of the film base which has applied onto the base various layers such as subbing layers, curl control layers, antistatic layers, antihalation layers, antiabrasion layers and the like. It has already been proposed in the art to sub polyester film with polymeric subs exemplified by latices of methylacrylate-vinylidene chloride-itaconic acid and such subs are satisfactory for a number of purposes. However, for some usages even the better polymeric subs do not sufficiently adhere to withstand photographic processing or the like treatments to which the photographic product may be subjected. Accordingly, there has occurred at times some separation of subbing layers or the photographic emulsion layer has cracked, skidded over the surface of the support, or separated from the support.

In order to improve the adhesion of layers to polyester supports, a large number of expedients have been described in the prior art. It has been proposed to treat the polyester base with rather corrosive chemicals or other treatments varying from the use of strong inorganic acids to mechanical or electrical treatment of the film surface. It has also been proposed to subject the polyester film to which there have been applied one or more layers to rather high heating, sometimes with pressure for the purpose of causing the layers to more strongly bond to the base. While such prior art treatments may be employed for preparing a polyester film product for use in certain fields, in general many of the heretofore suggested procedures are not satisfactory for use in preparing polyester film products for photographic use. As thought apparent, the extensive heating of a composite film product may cause deterioration, physical deformation, or other undesirable effects in the material for photographic purposes. In addition, certain of the procedures suggested in the prior art involving the use of corrosive chemicals or ones having obnoxious or undesirable odor may not be acceptable when the product is for certain uses.

This problem of adhering various esters to polyester film base is discussed in companion copending Nadeau et al., U.S. application Serial No. 590,984, filed June 12, 1956, now U.S. Patent No. 2,943,937. In said patent there is described procedure for treating the polyester film base to render it more receptive to certain layers that are to be applied thereto.

In view of the aforementioned difficulties concerning the adhesion of various layers to polyester film base or support it is believed apparent that the development of new and somewhat simplified ways of better securing one or more layers to polyester surfaces represents a highly desirable result. After extended investigation we have found certain procedures which will be described in detail hereinafter whereby the adherence of polymeric subs and other layers may be accomplished in a manner which is thought to be simpler than procedures heretofore used and which eliminates high heating of the coated product thereby enabling the production of a composite film product which has utility for photographic purposes.

This invention has for one object to provide a polyester film product carrying on at least one surface one or more layers which are adhered to the polyester base and to one another in a relatively secure improved manner without deterioration or physical distortion of the base. Another object is to provide a polyester film product of the type indicated wherein one of the layers is a polymeric sub layer which layer is not only more strongly adhered to the base, but the layer is also less susceptible to crazing, cracking or skidding and the like after coating with a photographic emulsion. Still another object is to provide a new composite intermediate product for photographic uses which product is comprised of a polyester base that carries a sub layer and at least one further layer on the sub layer, said layers being relatively strongly bonded together and having other advantages.

A still further object is to provide procedures for preparing composite film products of the class indicated whereby one or more sub, gelatin or, curl control, antistatic, antihalation or photographic emulsion layers may be applied to a polyester film base with improved adhesion of the layers and other improvements such as freedom from cracking and the like. Another object is to provide certain new coating compositions which may contain additive components or otherwise may have novel composition aspects which compositions are specially suitable for applying to polyester film bases. Other objects will appear hereinafter.

In the broader aspects of this invention we have found that there may be added to polymeric subs, gelatin coatings and the like layers a small amount of certain additive chemicals with the advantageous result that such layers will better adhere or otherwise have imparted thereto improved properties. In particular we have found that if certain specific dihydroxy aromatic chemicals exemplified by the preferred chemical resorcinol are incorporated into polymeric subs, such polymeric subbing compositions will better adhere to polyester film supports, either treated or untreated polyester film supports. These particular dihydroxy compounds we have discovered are relatively free of obnoxious properties so that the resultant coated polyester product has particular utility for photographic purposes. We have further found that the polymeric subbing compositions may be modified in composition. Although the prior art polymeric subs may be used with the additives of the present invention in many instances in addition to incorporating the resorcinol in the subbing composition, we prefer to alter the polymer somewhat. In general this may be accomplished by replacing the itaconic acid component of the polymeric subbing material with an ester exemplified by the lower alkyl esters of itaconic acid. By so modifying the polymeric sub it is possible to obtain a better coating in that the coating is free of hair line cracks and the like as well as any tendency to shrink and creep.

In the preferred product of the present invention the polymeric sub is overcoated with a further layer particularly a gelatin sub layer. We have found that if such gelatin sub layer has incorporated therein resorcinol or certain other additives that the properties and adhesion of the gelatin sub layer are improved. In the instance of this gelatin sub layer overcoating we have found that a wider variety and number of additives may be incorporated than the additives used for the polymeric sub. Although in the preferred embodiment of composite film product it is best to use additives only in the polymeric sub layer, these additives and all of the other features of the present invention can be used to advantage in either the polymeric sub layer or the gelatin sub layer or in both of these layers. Presumably with the additive in the gelatin sub layer a portion thereof may be preferentially absorbed by the surface of the polymeric sub layer thereby making the polymeric sub layer more thermo-sensitive. Therefore, even though there is no additive initially incorporated in the polymeric sub, this sub absorbs sufficient additive from the gelatin layer so that better bonding is obtained at reduced temperature.

In further detail our invention may be practiced as follows. The polyester film base to which it is desired to apply a polymeric sub, gelatin layers and the like may be any of the polyester compositions referred to in companion Patent No. 2,943,937 referred to above. Or, the polyester composition may be in accordance with that disclosed in U.S. Patent 2,627,088 (also referred to in said companion application) or in accordance with 2,779,684. In accordance with the description in said last-mentioned patent, a polyester material exemplified by polyethylene terephthalate is coated with the polymeric sub and then the resultant film is oriented by stretching and other steps applied thereto such as heat setting. In the present invention the compositions above referred to may be applied to the polyester film as produced and the film processed by stretching and the like treatment, as is usual in the art. Accordingly, the particular polyester film used, the procedure and apparatus for the coating thereof and the orientation of the film are not a limitation on the present invention. Any of the usual coating apparatus and processing steps employed in the art may be employed in treating the film product of the present invention.

Likewise as already mentioned above, although we prefer to use the special polymeric subbing compositions of the present invention wherein the acid component may be replaced by certain esters or otherwise modified, the usual subbing compositions may be employed with our dihydroxy aromatic additive. Other polymeric subbing compositions operable with this invention are discussed at column 3 of the above-mentioned U.S. Patent No. 2,943,937. In further detail, for producing a composite film to be used for photographic purposes we would in certain instances prefer to sub the polyester film base with a polymeric subbing composition such as the following:

Polymer of vinylidene chloride and the mono ethyl ester of itaconic acid: 94% vinylidene chloride, 6% mono ethyl ester of itaconic acid.

Polymer of vinylidene chloride and the mono methyl ester of itaconic acid: 96% vinylidene chloride, 4% mono methyl ester of itaconic acid.

Polymer of vinylidene chloride and the mono butyl ester of itaconic acid: 91% vinylidene chloride, 9% mono butyl ester of itaconic acid.

Or in some instances the somewhat different composition comprising terpolymers of acrylonitrile, vinylidene chloride and acrylic acid may be used: 10 to 15% acrylonitrile, 1 to 12% acrylic acid, balance vinylidene chloride.

However, the known type of polymeric subbing compositions essentially comprised of 15% methylacrylate, 83% vinylidene chloride, 2% itaconic acid is frequently used. For convenience of reference this composition will be referred to as MaVcIt. In any instance the polymeric sub employed would preferably for most usages have incorporated therein 0.1–5% of a dihydroxy compound in accordance with the present invention as follows: Resorcinol, 4-chloro-resorcinol, 1-3 naphthalene diol, 1-6 naphthalene diol, 2-4 dihydroxy toluene.

These additives are merely incorporated into the (polymeric sub) resin latex as addenda after the latex has been prepared. Water solubility of the additives is not a requirement, since they can be selectively absorbed by the resin particles in the latex and act on the base surface as the water evaporates.

Excessive concentrations of these additives will pre-crystallize the base surface prior to drafting and tentering, thus when the sheet is oriented, surface crazing will occur; hence, we prefer not to exceed 5%.

The aforementioned polymeric subbing compositions may be applied to the polyester base in accordance with the procedure described in 2,779,684, for example. After applying the sub to the film surface the subbed film may then be oriented and otherwise processed as described in detail in such patent. Hence, extended description of such process steps herein is unnecessary.

The resultant polymeric sub, due to the inclusion of resorcinol or other of the additives of the present invention not only is strongly anchored to the polyester film but the combination of this sub and additional gelatin sub and photographic emulsion layers are relatively free of cracks. While we do not wish to be bound by any theory of operation, it appears that in the present instance where the dihydroxy aromatic compounds are added to the polymeric latex used as the sub the following may occur. As the water evaporates from the surface coating of the polymeric sub the additives of the present invention concentrate and act to partially swell the surface of the unoriented polyester composition thereby resulting in a more intimate contact of the sub with the polyester surface and thereby produce better adhesion.

Although the improved sub of the present invention may have applied thereover any of the layers heretofore applied over such type of subs such as a conventional gelatin layer, we prefer to apply a special gelatin sub layer. We have found as an additional feature of the present invention as briefly alluded to above that such gelatin sub layers as are frequently applied over polymeric subs may be improved if additives are included in such further layers.

In further detail, after the polyester film has been subbed in a suitable manner with a polymeric sub, in accordance with a further and preferred feature of the present invention, there is applied over the sub a further sub layer or coating comprised of gelatin which contains an additive. Such gelatin additives include resorcinol also already described above. However, in addition there are a number of other materials which may be incorporated including cyclohexanone, triacetin, glycerine, pentanediol, dimethoxy tetraethylene glycol and methoxy triglycol acetate. These materials are well-known chemicals from which it will be observed that in many instances they are polyhydroxy organic liquids.

Such gelatin sub layer containing suitable additive as just described not only very readily may be coated onto the polymeric sub, but it is not necessary to subject the resultant composite product to high heating in order to obtain an adequate combination of the layers. That is, heating the resultant composite product in air to a temperature between 140 F. and 200° F. which is lower than temperatures that heretofore have been utilized and which prior used high temperatures have tended to impair the product.

Therefore, in summarizing the broader aspects of our invention it will be seen that we have provided a new composite film product. This product is made up of the polyester film base. On the base there is carried a polymeric sub layer. Such sub layer may be of the older polymeric compositions or may be the special combination of the present invention wherein the itaconic acid component has been replaced. Such subs preferably will contain quantities of the additives of the present invention such as polyhydroxy aromatic compounds. Over such sub there is applied one or more layers exemplified by a gelatin sub layer which also contains additives for facilitating the bonding of the gelatin layer. Over the gelatin layer there may be applied still further layers exemplified by light-sensitive photographic emulsions. However, extended description concerning the application of such emulsion layers is unnecessary since with the composite film base product of the present invention there is little or no problem of applying any type of emulsion thereto. Such emulsion layers readily adhere to the last-mentioned gelatin sub layer without problems of emulsion skidding and emulsion cracking. As already indicated above, the incorporation of the additives into the gelatin sub layer in accordance with the present invention apparently may function to some extent as a plasticizer for the gelatin sub layer thereby rendering it more receptive to the emulsion layers applied thereon.

A further understanding of our invention will be had from a consideration of the following examples which are set forth for illustrating certain preferred embodiments of the present invention.

EXAMPLE I

In accordance with this example a commercial polyester film (specifically polyethylene terephthalate) of photographic quality was subbed with an aqueous polymer of the prior art, namely the methylacrylate-vinylidene chloride-itaconic acid type. This sub, designated the unmodified MaVcIt polymeric sub, was of the following compositions in weight percent—7% terpolymer comprising: 15% methyl acrylate, 2% itaconic acid, 83% vinylidene chloride, 0.1% dispersing agent, sodium salt of alkyl and aryl polyether sulfate (Triton 770), 0.5% spreading agent, saponin, 92.4% distilled water.

Instead of the dispersing agent listed above, lauryl alcohol sulfate (Dupanol ME) or an ammonium salt of a sulfate ester of an alkyl phenoxy polyoxy ethylene ethanol (Alypol–CO–436) may be used.

Instead of the spreading agent listed above, polyglycerol monolaurate or sodium alkyl aryl sulfonate (Padasol) may be used.

However, this example of a sub had added thereto in accordance with the present invention, a content of 0.5% resorcinol which replaced an equal weight of distilled water.

The sub was applied to the film support by conventional roller application.

The sub was applied to the base to the extent of about 10–50 grams per thousand square feet of film surface. This provides a sub layer of about ½ to 2 microns thickness.

The resultant subbed product was then oriented by heating and stretching, coated with the unmodified aqueous gel sub described in Example IV hereinafter and with a photographic emulsion and otherwise processed in a conventional manner. Due to the presence of the resorcinol, the sub adhered to the base in an improved manner.

This effect was demonstrated by subjecting samples of the film to the rigorous "Processed Scotch Tape Stripping Test." This test is performed on processed film using transparent "Scotch" tape ½ inch wide manufactured by the Minnesota Mining and Manufacturing Company. The tape is firmly pressed to an edge of the processed emulsion and removed in short, jerky pulls. The following test results show the significant improvement in emulsion adhesion attributable to the present invention.

| Composition of polymeric sub: | Emulsion adhesion in "Processed Scotch Tape Stripping Test" |
|---|---|
| MaVcIt polymeric sub (check) | All emulsion easily stripped from support. |
| MaVcIt polymeric sub plus 0.5% resorcinol (preferred concentration) | Very slight amount of emulsion stripped from support. |

EXAMPLE II

In accordance with this example the polyester film subbed and the procedure for subbing were essentially the same as set forth in the preceding example. However, instead of the terpolymer in the unmodified MaVcIt polymer sub of Example I, in this example special polymeric sub components were used as follows:

Polymer A of vinylidene chloride and the mono ethyl ester of itaconic acid: 94% vinylidene chloride, 6% mono ethyl ester of itaconic acid.

Polymer B of vinylidene chloride and the mono methyl ester of itaconic acid: 96% vinylidene chloride, 4% mono methyl ester of itaconic acid.

Polymer C of vinylidene chloride and the mono butyl ester of itaconic acid: 91% vinylidene chloride, 9% mono butyl ester of itaconic acid.

Terpolymer D of acrylonitrile, vinylidene chloride and acrylic acid: 10 to 15% acrylonitrile, 1 to 12% acrylic acid, balance vinylidene chloride.

These subs were applied to the film support by conventional roller technique.

In addition to the "Process Scotch Tape Stripping Test" described in Example I, samples of these films were subjected to the "Emulsion Cracking Test." In the latter test, samples of film 3 inches square are placed in an oven at 160° F. for one month. The extent of cracking of the emulsion is determined by visual examination.

The superiority of the special polymeric sub compositions over the prior art MaVcIt polymeric sub is shown by the following test results.

| Polymer Component of Polymeric Sub | Emulsion Adhesion in "Processed Scotch Tape Stripping Test" | Cracking of Raw Emulsion in "Emulsion Cracking Test" |
|---|---|---|
| Polymer A | Slight amount of emulsion stripped from support. | No emulsion cracks. |
| Polymer B | Most of emulsion stripped from support but evidence of some adhesion. | Do. |
| Polymer C | | Do. |
| Polymer D | No emulsion stripped from support | Moderate emulsion cracking. |
| MaVcIt polymeric sub (Check) | All emulsion easily stripped from support. | Bad emulsion cracking. |

EXAMPLE III

In accordance with this example the film base and subbing procedures were generally similar to that described in connection with Example II. However, in these subs in additional to the polymeric components there was included 0.5% of resorcinol additive in accordance with the present invention. The resultant product was tested by the procedures indicated in Examples I and II. Such tests showed that the adhesion of the sub to the base had been improved as follows:

| Composition of polymeric sub: | Emulsion adhesion in "Processed Scotch Tape Stripping Test" |
|---|---|
| Polymer B of Example II plus 0.5% resorcinol | No emulsion stripped from support. |
| Polymer B of Example II (check) | Most emulsion stripped from support but evidence of some adhesion. |

EXAMPLE IV

In accordance with this example a product subbed with the unmodified MaVcIt polymeric sub was produced. After the subbed product had been heated and suitably stretched for orientation, the film product was overcoated with a gelatin sub hereinafter called a gel sub. The unmodified gel sub was of the following composition:

| Component: | Weight percent |
|---|---|
| Gelatin | 0.66 |
| Saponion | 0.01 |
| Chrome alum | 0.01 |
| Ludox (colloidal dispersion of silica) | 0.20 |
| Distilled water | 99.12 |

Instead of saponin, polyglycerol monolaurate or sodium alkyl aryl sulfonate (Padasol) may be used. Instead of chrome alum, chromic chloride or formaldehyde or silicic acid may be used.

However, this example of a sub had added thereto in accordance with the present invention, a content of 3% resorcinol which replaced an equal weight of distilled water.

This gelatin layer was coated onto the sub by conventional hopper-air knife technique to a thickness of approximately .00001 inch and cured at 140° to 145° F. The resultant composite film product comprised of polyester base-polymeric sub-gel sub was subjected to various emulsion adhesion tests.

In the "Regular Stripping Test," dry, raw film or dry processed film is torn and a tab of emulsion is pulled back upon itself by hand. The length of the tab of emulsion which can be stripped from the support indicates the quality of the adhesion to the support. A test result of 0 cm. indicates excellent adhesion and of 6 cm. indicates bad adhesion. The excellent adhesion of the modified gel sub is shown by the following test results:

| Composition of Gel Sub | Length of Emulsion Tab Stripped from Support | |
|---|---|---|
| | Raw Film, cm. | Processed Film, cm. |
| Unmodified gel sub (check) | 7 | 7 |
| Gel sub plus 3% resorcinol | 1 | 0 |

In the "Regular Tape Stripping Test" dry, raw film or dry processed film is cross-hatched with a sharp point on the emulsion side through the sub layers. Paper backed pressure-sensitive adhesive tape is firmly pressed into adherence to this area and subsequently stripped off with one fast pull. Test results are reported in percent of the cross-hatched area of emulsion stripped from the support. The superior adhesion of modified gel sub is shown in the following table:

| Composition of Gel Sub | Percent Area of Emulsion Stripped from the Support | |
|---|---|---|
| | Raw Film, percent | Processed Film, percent |
| Unmodified gel sub (check) | 50 | 90 |
| Gel sub plus 2½ to 3% resorcinol | 0 | 0 |

In the "Wet Stripping Test" samples of processed film are scribed through the sub layers with a line extending from the center of the sample across the edge. This line is rubbed with the fingers at the center and the edge of the sample. The length of emulsion stripped from the support by controlled rubbing ranges from 0 cm. for excellent adhesion to 7 cm. for very bad emulsion adhesion. The superior adhesion of the modified gel sub is shown below:

| Composition of Gel Sub | Length of Emulsion Rubbed from Support | |
|---|---|---|
| | Center of Sample, cm. | Edge of Sample, cm. |
| Unmodified gel sub (check) | 7 | 7 |
| Gel sub plus 3% resorcinol | 0 | 0 |

These test results show that there was strong adhesion of the gel sub layer to the polymeric sub at relatively low curing temperature.

EXAMPLE V

Additional runs similar to those described in detail in Example IV were carried out wherein there was added to the gel sub other of the additives referred to above.

Films coated with the unmodified MaVcIt polymeric sub, and oriented and heat set, were overcoated with a gel sub containing 5% glycerine. Similar films were prepared with a gel sub containing 4% cyclohexanone. The significantly improved adhesion of emulsion of the support characteristic of the unmodified gel subs is shown by tests described above in detail. Test results are summarized in the following table.

Another important aspect of the invention involves the combination of the polymer and gel subs. This approach obviously reduces the coating steps involved. Also, the combined polymer-gel sub can be applied to fully oriented polyester support.

As apparent from the prior art, such as the aforementioned Patents 2,627,088 and 2,779,684, subbing practice for polyester base has been to deposit a resin prime coat from a water dispersion (latex) onto the extruded base surface prior to orienting it, then draft and tenter and subject to relatively high temperature, while the base is held in restraint, to fuse the prime coat resin with the film base resin to form a firmly anchored prime coat or undercoat. An aqueous solution of gelatin was

*Adhesion characteristics of modified aqueous gel subs*

| Composition of Aqueous Gel Sub | "Regular Stripping Test" (Length of Emulsion Tab Stripped from Support) | | "Regular Tape Stripping Test" (Percent area of Emulsion Stripped from Support) | | "Wet Stripping Test" (Length of Emulsion Rubbed from Support) | |
|---|---|---|---|---|---|---|
| | Raw Film, cm. | Processed Film, cm. | Raw Film, percent | Processed Film, percent | Center of Sample, cm. | Edge of Sample, cm. |
| Unmodified aqueous gel sub (check) | 7 | 7 | 40 | 20 | 7 | 7 |
| Aqueous gel sub plus 4% cyclohexanone | 0 | 0 | 0 | 0 | 0 | 0 |
| Aqueous gel sub plus 5% glycerine | 0 | 0 | 0 | 0 | 0 | 0 | then applied over this undercoat surface and again subjected to heat to bring the two surfaces into intimate contact to form a strong bond. Prior to the present invention it has been thought impossible to bond gelatin from an aqueous solution directly to the polyester film base surface. For this reason, a resinous material to which gelatin from an aqueous solution will adhere has been selected and used as a prime coat.

In accordance with this embodiment we have now developed a technique by which gelatin from an aqueous solution can be directly and firmly anchored to the surface of either unoriented or fully oriented and heat set polyester film base, in substantially one operation.

We have found that resorcinol and the other dihydroxy compounds of the instant invention have a swelling action on fully oriented polyester film base. An aqueous gelatin solution has been compounded containing relatively small concentrations of resorcinol, along with gelatin and a vinylidene chloride compound to gain a combination gel-polymer sub which displays the above discussed properties.

The combination polymer-gel composition necessarily includes from about .5 to 3 parts by weight of gelatin, from about .75 to 4 parts by weight of a vinylidene chloride copolymer, and from about 3 to 25 parts by weight of a dihydroxy compound selected from the group consisting of resorcinol, 1,3-naphthalene diol, 1,6-naphthalene diol, trichloro acetic acid, orcinol, catechol, chloral hydrate, 4-chlororesorcinol and 2,4-dihydroxy toluene.

Other ingredients such as gel hardeners, spreading agents, glycerine and preservatives may optionally be added. When this solution is applied to the surface of fully oriented polyester film base, it dries down to form a firm bond with the base surface. To resist excessive softening, during processing of the sensitized photographic film, which would result in wet stripping of the emulsion layer, a concentration of resin latex, such as MaVcIt referred to above, is added to the solution. This results in a gel layer having greater water resistance and the ability to resist wet stripping of the emulsion.

EXAMPLE VI

A preferred composition of the aqueous sub of this example is as follows in weight percent—5.00% resorcinol, 1.00% terpolymer component of unmodified MaVcIt polymeric sub, Example I, 0.50% gelatin, 0.50% glycerine, 0.50% glacial acetic acid, 0.10% saponin, 0.01% chrome alum, 92.39% distilled water.

The concentrations of the ingredients may be varied. Only the polymer, gelatin and dihydroxy compounds are required. However, the concentrations given above appear to be quite satisfactory when the gel-subbed polyester sheet is to be used for photographic purposes.

The resorcinol in this formula acts as already described above. The spreading agent, saponin, permits the use of an aqueous system to bring the gelatin in intimate contact with the base surface. The resin latex, as previously described, and the chrome alum, "firm up" the gelatin layer to prevent wet stripping of the emulsion. The glacial acetic acid improves stabilization of the mixed gel-resin latex sub. The gelatin plasticizer, which may be present in amounts of from about .5 to 5 parts by weight, keeps the gelatin soft during the drying phase to enhance intimate contact with the surface of the film base. Other gelatin plasticizers which may be substituted for glycerine are cyclohexanone, triacetin, pentanediol, dimethoxy tetraethylene glycol and methoxy triglycol acetate.

The coating of this example was directly applied to a standard fully oriented polyester support and the resultant composite product heated to below about 250° F. The application was by the conventional hopper-air knife procedure referred to above.

Difficulties, both in uniform application of the sub layers and in obtaining satisfactory adherence of the photographic emulsion layer were eliminated. In addition, the high temperature heretofore required for bonding these layers to the film support was not required. That is, the direct sub of the instant example overcomes these difficulties and in addition simplifies the process, reducing costs.

Also while the use of a thermoplastic resin undercoat or prime coat may result in cracking and skidding of certain photographic emulsions when exposed to conditions under which the emulsion shrinks, this does not happen when the emulsion is bonded to the film base by a direct gel sub as in this example.

Adherence tests of the directly applied gel-sub of this example by the several test procedures already described in detail above showed that the sub, even though applied to fully processed polyester terephthalate support adhered satisfactorily.

EXAMPLE VII

In accordance with this example a product was subbed with modified polymeric sub containing 0.5% resorcinol similar to that described in Example I. After the subbed product had been heated and suitably stretched for orientation, the film product was overcoated with the modified gelatin sub containing 3% resorcinol described in Example IV. The subbing procedures were generally similar to those described in Example IV.

The resulting photographic emulsion coated film product was subjected to the "Processed Scotch Tape Stripping Test" described in Example I. The improved adhesion of modified polymeric sub in combination with the modified gel sub is shown below:

| Composition of subs: | Emulsion adhesion in "Processed Scotch Tape Stripping Test" |
|---|---|
| Unmodified polymeric sub plus unmodified gel sub (check) | All emulsion easily stripped from support. |
| Polymeric sub containing 0.5% resorcinol plus gel sub containing 3% resorcinol | Very slight amount of emulsion stripped from support. |

EXAMPLE VIII

In accordance with this example the film base and subbing procedures were generally similar to those described in Example I except that 0.5% 2–4 dihydroxy toluene was added to the unmodified MaVcIt polymeric sub instead of resorcinol. The superior adhesion of the modified polymeric sub is shown by the following results of the "Processed Scotch Tape Stripping Test."

| Composition of polymeric sub: | Emulsion adhesion in "Processed Scotch Tape Stripping Test" |
|---|---|
| MaVcIt polymeric sub (check) | All emulsion easily stripped from support. |
| MaVcIt polymeric sub plus 0.5% 2–4 dihydroxy toluene | No emulsion stripped from support. |

The adhesion of the gel sub to the polymeric sub as well as improved thermo-sensitivity of the subs is obtained by incorporating any of the additives listed above in the gel sub. However, in general we prefer to use resorcinol as an additive since as indicated above, it may be incorporated in either the sub layer or the gelatin layer or both.

The concentration of the additive to the polymeric sub layer may vary between 0.1% and 5%, 5% usually being most satisfactory.

The concentration of the additive to the gelatin layer may vary between 2–10%, 3–5% usually being most satisfactory.

Some films require an emulsion layer on one side of the support and another layer, such as an antihalation layer on the other side of the support. In this case, the polymeric sub and gel sub described above are coated on both sides of the support before applying outer layers.

For a more complete understanding of the invention reference is made to the following detailed drawing, in which:

FIG. 1 is a view in cross section of a film element comprising a film support and a subbing layer;

FIG. 2 is a view in cross section of a film product comprising a film support, two subbing layers, and a light-sensitive layer;

FIG. 3 is a view in cross section of a film element comprising a film support and two different subbing layers;

FIG. 4 is a view in cross section of a film product comprising a film support, two subbing layers, and a light-sensitive layer; and FIG. 5 is a view in cross section of a film element comprising a film support and another subbing layer.

Referring to FIG. 1 of the drawing there is shown a film element 10 comprising a polyester film support 12 such, for example, as polyethylene terephthalate film support and a subbing layer 14 of a composition comprising a polymer consisting largely of vinylidene chloride in which is incorporated an aromatic dihydroxy compound, such as resorcinol.

In FIG. 2 of the drawing there is shown a film product 20 which is comprised of a polyester film support 22, a first subbing layer 24 of a composition comprising a polymer consisting largely of vinylidene chloride in which is incorporated an aromatic dihydroxy compound, such as resorcinol, a second subbing layer 26 comprising gelatin, and a light-sensitive emulsion layer 28.

Shown in FIG. 3 of the drawing is a film element 30 which is comprised of a polyester film support 32 such as polyethylene terephthalate film support, a first subbing layer 34 which comprises a resinous polymer, and a second subbing layer 36 which is of a composition comprised of gelatin and an additive such as resorcinol. The resinous polymer employed as the subbing layer 34 can be of any of the above listed polymers comprised largely of vinylidene chloride with or without a dihydroxy aromatic compound incorporated therein.

In FIG. 4 of the drawing there is shown a photographic film product 40 similar to that shown in FIG. 3 with the exception that it is comprised also of a light-sensitive layer. Thus, the photographic film product 40 is comprised of a polyester film support 42, a first subbing layer 44 comprising a resinous polymer, a second subbing layer 46 comprising gelatin and an additive, and a layer 48 of light-sensitive emulsion.

FIG. 5 of the drawing shows a film element 50 comprising a polyester film support 52 and a single subbing layer 54, which layer 54 is a composition comprising gelatin, a dihydroxy aromatic compound such as resorcinol, and a polymer consisting largely of vinylidene chloride.

It is believed apparent from the foregoing that we have provided relatively simple procedures for obtaining improved adherence of layers in the making up of a composite film product utilizing polyester film base. Our method is simpler and more economical inasmuch as more moderate temperatures and less drastic chemical or the like treatments are required. The present invention is in no way limited to the composition of any light-sensitive emulsion that may be applied on the composite film base of the present invention. Any known light-sensitive emulsion either black-and-white or color may be applied as the gelatin layer is fully receptive to any light-sensitive emulsions. Also coatings designed to reduce dimensional distortions, halation and static electricity may be applied to the composite film base of the present invention.

The percentage proportions described above are by weight.

The invention has been described in detail with particular reference to preferred embodiments thereof, but it will be understood that variations and modifications can be effected within the spirit and scope of the invention as described hereinabove and as defined in the appended claims.

We claim:

1. An aqueous coating composition for use in providing a highly adherent sub layer on a polyester film surface, said coating composition being comprised of, by weight, (1) from about 3 parts to 25 parts of a dihydroxy softening agent of polyester, (2) from about 0.5 part to 3 parts of gelatin, and, (3) from about 0.75 part to 4 parts of a vinylidene chloride copolymer.

2. An aqueous coating composition for use in providing a highly adherent sub layer on a fully oriented polyester film surface, said coating composition being comprised of, by weight, (1) from 3 to 25 parts of a softening agent for polyester selected from the group consisting of resorcinol, 1,3-naphthalene diol, 1,6-naphthalene diol, trichloro acetic acid, orcinol, catechol, chloral hydrate, 4-chlororesorcinol and 2,4-dihydroxy toluene, (2) from about 0.5 part to 3 parts of gelatin, and, (3) from about 0.75 part to 4 parts of a vinylidene chloride copolymer.

3. An aqueous coating composition for use in providing a highly adherent sub layer on a fully oriented polyester film surface, said coating composition being comprised of, by weight, (1) from about 3 parts to 25 parts of resorcinol, (2) from about 0.5 part to 3 parts of gelatin, and (3) from about 0.75 part to 4 parts of a vinylidene chloride copolymer.

4. An aqueous coating composition for use in providing a highly adherent sub layer on a fully oriented polyester film surface, said coating composition being comprised of, by weight, (1) from 3 to 25 parts of a softening agent for polyester selected from the group consisting of resorcinol, 1,3-naphthalene diol, 1,6-naphthalene diol, trichloro acetic acid, orcinol, catechol, chloral hydrate, 4-chlororesorcinol and 2,4-dihydroxy toluene, (2) from about 0.5 part to 3 parts of gelatin, (3) from about 0.75 part to 4 parts of a vinylidene chloride copolymer, and, (4) from about 0.5 part to 5 parts of gelatin plasticizer.

5. An aqueous coating composition for use in providing a highly adherent sub layer on a fully oriented polyester film surface, said coating composition being comprised of, by weight, (1) from 3 to 25 parts of a softening agent for polyester selected from the group consisting of resorcinol, 1,3-naphthalene diol, 1,6-naphthalene diol, trichloro acetic acid, orcinol, catechol, chloral hydrate, 4-chlororesorcinol and 2,4-dihydroxy toluene, (2) from about 0.5 part to 3 parts of gelatin, (3) from about 0.75 part to 4 parts of a vinylidene chloride copolymer, and, (4) from about 0.5 part to 5 parts of a gelatin plasticizer selected from the group consisting of glycerine, cyclohexanone, triacetin, pentane-diol, dimethoxy tetraethylene glycol and methoxy triglycol acetate.

6. An aqueous coating composition for use in providing a highly adherent sub layer on a fully oriented polyester film surface, said coating composition being comprised of, by weight, (1) from 3 to 25 parts of a softening agent for polyester selected from the group consisting of resorcinol, 1,3-naphthalene diol, 1,6-naphthalene diol, trichloro acetic acid, orcinol, catechol, chloral hydrate, 4-chlororesorcinol and 2,4-dihydroxy toluene, (2) from about 0.5 part to 3 parts of gelatin, (3) from about 0.75 part to 4 parts of a vinylidene chloride copolymer, and, (4) from about 0.5 part to 5 parts of glycerine.

7. In a method of preparing a composite film element for use in the manufacture of photographic film products the steps of which comprise (A) orienting a sheet of polyethylene terephthalate film, (B) coating said sheet on at least one surface thereof with an aqueous coating composition comprised of, by weight, (1) from about 3 parts to 25 parts of a dihydroxy softening agent for polyester, (2) from about 0.5 part to 3 parts of gelatin, (3) from about 0.75 part to 4 parts of a vinylidene chloride copolymer, and, (C) heating the coated sheet to provide a well-bonded composite element.

8. A photographic film product produced according to the method of claim 7.

9. In a method of preparing a composite film element for use in the manufacture of photographic film products the steps of which comprise (A) orienting a sheet of polyethylene terephthalate film, (B) coating said sheet on at least one surface thereof with a coating composition comprised of, by weight, (1) from 3 to 25 parts of a softening agent for polyester selected from the group consisting of resorcinol, 1,3-naphthalene diol, 1,6-naphthalene diol, trichloro acetic acid, orcinol, catechol, chloral hydrate, 4-chlororesorcinol and 2,4-dihydroxy toluene, (2) from about 0.5 part to 3 parts of gelatin, (3) from about 0.75 part to 4 parts of a vinylidene chloride copolymer, and, (C) heating the coated sheet to a temperature of about 250° F. to provide a well-bonded composite film element.

10. A photographic film product produced according to the method of claim 9.

No references cited.

NORMAN G. TORCHIN, *Primary Examiner.*

R. H. SMITH, *Assistant Examiner.*